US011811296B2

(12) United States Patent
Long et al.

(10) Patent No.: US 11,811,296 B2
(45) Date of Patent: Nov. 7, 2023

(54) ELECTRIC MACHINE WITH CONFIGURABLE STATOR/ROTOR COOLING

(71) Applicant: Deere & Company, Moline, IL (US)

(72) Inventors: Randall L Long, Coffeyville, KS (US); Stacy K. Worley, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 811 days.

(21) Appl. No.: 16/789,070

(22) Filed: Feb. 12, 2020

(65) Prior Publication Data
US 2021/0249935 A1   Aug. 12, 2021

(51) Int. Cl.
H02K 1/32   (2006.01)
H02K 9/197   (2006.01)
B60K 1/00   (2006.01)
H02K 21/14   (2006.01)
H02K 9/19   (2006.01)
H02K 5/20   (2006.01)
H02K 9/10   (2006.01)

(52) U.S. Cl.
CPC .............. H02K 9/197 (2013.01); B60K 1/00 (2013.01); H02K 5/203 (2021.01); H02K 9/19 (2013.01); H02K 21/14 (2013.01); B60K 2001/006 (2013.01); H02K 9/10 (2013.01)

(58) Field of Classification Search
CPC ............ H02K 1/32; H02K 5/20–5/207; H02K 9/00–9/28
See application file for complete search history.

(56) References Cited

U.S. PATENT DOCUMENTS

| 4,418,777 | A  | 12/1983 | Stockton |
| 5,309,778 | A  | 5/1994  | Antonov |
| 6,023,134 | A  | 2/2000  | Carl et al. |
| 6,078,115 | A  | 6/2000  | Uchida et al. |
| 8,454,326 | B2 | 6/2013  | Grosskopf et al. |
| 8,541,915 | B2 | 9/2013  | Burns et al. |

(Continued)

FOREIGN PATENT DOCUMENTS

| CN | 106787452 A | 5/2017 |
| DE | 10303050 B4 | 5/2006 |

(Continued)

OTHER PUBLICATIONS

Non-Final Office Action issued in Utility U.S. Appl. No. 16/842,608 dated Feb. 13, 2023 (14 pages).

(Continued)

Primary Examiner — Ramon M Barrera
(74) Attorney, Agent, or Firm — KLINTWORTH & ROZENBLAT IP LLP

(57) ABSTRACT

An electric machine includes a drive assembly and a casing. The drive assembly has a stator and a rotor rotatable about a drive axis relative to the stator. The casing contains the drive assembly and has coolant passages, the coolant passages defining a first inlet opening, a second inlet opening, a stator feed circuit, a rotor feed circuit, and an intersection providing fluid communication between the stator feed circuit and the rotor feed circuit. The coolant passages receive at least one coolant input through one or more of the first inlet opening and the second inlet opening to deliver coolant to the rotor through the rotor feed circuit and to the stator through the stator feed circuit.

18 Claims, 9 Drawing Sheets

(56) References Cited

U.S. PATENT DOCUMENTS

| | | |
|---|---|---|
| 8,776,976 B2 | 7/2014 | Krafft |
| 9,096,115 B2 | 8/2015 | Ho et al. |
| 9,402,344 B1 | 8/2016 | Wenzel et al. |
| 9,698,649 B2 | 7/2017 | Cemke et al. |
| 9,915,192 B2 | 3/2018 | Buschur |
| 10,099,552 B2 | 10/2018 | Long et al. |
| 10,228,027 B2 | 3/2019 | Jones et al. |
| 10,252,609 B2 | 4/2019 | Falls et al. |
| 10,840,768 B2 | 11/2020 | Suzuki |
| 2008/0024020 A1 | 1/2008 | Lund et al. |
| 2008/0230289 A1 | 9/2008 | Schoon et al. |
| 2011/0215588 A1 | 9/2011 | Gilbert, Jr. |
| 2014/0175916 A1 | 6/2014 | Chamberlin et al. |
| 2014/0364263 A1 | 12/2014 | Tokunaga et al. |
| 2015/0008677 A1 | 1/2015 | Brock |
| 2016/0129786 A1 | 5/2016 | Petersen et al. |
| 2016/0145833 A1 | 5/2016 | Abdel-Baqi et al. |
| 2017/0001629 A1 | 1/2017 | Vyncke et al. |
| 2017/0072778 A1 | 3/2017 | Ornella et al. |
| 2017/0248196 A1 | 8/2017 | Turner et al. |
| 2018/0093564 A1 | 4/2018 | Long et al. |
| 2018/0100564 A1 | 4/2018 | Fliearman et al. |
| 2018/0162221 A1 | 6/2018 | Long et al. |
| 2018/0205286 A1 | 7/2018 | Barekar et al. |
| 2019/0001826 A1 | 1/2019 | Suzuki |
| 2019/0252939 A1 | 8/2019 | Peiffer et al. |

FOREIGN PATENT DOCUMENTS

| | | |
|---|---|---|
| DE | 112006000762 T5 | 1/2008 |
| DE | 102007033457 A1 | 2/2008 |
| DE | 102010004596 A1 | 7/2011 |
| DE | 102010010578 B4 | 3/2014 |
| DE | 112010005285 B4 | 2/2015 |
| DE | 102015118535 A1 | 5/2017 |
| JP | 2016166639 A | 9/2016 |

OTHER PUBLICATIONS ip.com, Connector Cooling Technique for an Electric Machine, IP.com Prior Art Database Technical Disclosure, Authors et al.: Disclosed Anonymously, IP.com No. IPCOM000258786D, IP.com Electronic Publication Date: Jun. 13, 2019. (3 pages).

Deere & Company, pending utility U.S. Appl. No. 62/889,258, filed Aug. 20, 2019 which claims the benefit of U.S. Appl. No. 62/889,258, filed Aug. 20, 2019. (29 pages).

Deere & Company, pending U.S. Appl. No. 62/889,258, filed Aug. 20, 2019. (29 pages).

Deere & Company, pending U.S. Appl. No. 62/889,540, filed Aug. 20, 2019. (24 pages).

German Search Report issued in application No. DE1021203379.2 dated Nov. 12, 2021 (05 pages).

German Search Report issued in application No. DE102021200039.8 dated Sep. 21, 2021 (05 pages).

Non-Final Office Action issued in Utility U.S. Appl. No. 16/897,464 dated Nov. 30, 2022 (26 pages).

ELECTRIC MACHINE WITH CONFIGURABLE STATOR/ROTOR COOLING

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to electric machines, and in particular to the cooling of electric motors and generators.

BACKGROUND OF THE DISCLOSURE

Electric machines (also referred to as "e-machines"), such as various electric motors (e.g., alternating current (AC) motors and direct current (DC) motors), generators and the like, may be installed in work vehicles, such as used in the construction, agriculture, forestry, mining and other industries. Such electric machines may be mated to various components of the work vehicle, including onboard devices (e.g., traction motors mated to a transmission or wheel axle), work implements (e.g., actuators for loaders, balers, blades, etc.) and the like. The various applications may require different duty cycles that result in significantly varied load profiles. The duty cycle and corresponding load profile for an electric machine result in heat generation in different areas of the electric machine (e.g., a stator, rotor, rotor magnets, shaft and the like). For example, applications with relatively higher rotational speeds and/or operating times may result in a relatively greater heat load in rotors and rotor magnets. Applications with relatively lower rotational speeds (e.g., idling) and/or shorter operating times may result in a relatively high current and greater heat load in stators. Moreover, particular regions of a rotor or stator may experience greater heat loads than other areas of the same rotor or stator. To dissipate heat, electric machines may have cooling systems that route cooling oil through the internals of the machines. A general-purpose electric machine with a single cooling layout may not be able to optimally cool the heavier loaded components or areas of the electric machine when operated in certain applications. Electric machines may be manufactured with cooling systems that are tailored to target specific components or areas of high heat generation for specific applications but may come at the cost of a separate electric machine design for each application.

SUMMARY OF THE DISCLOSURE

The disclosure provides an electric machine with improved cooling.

In one aspect, the disclosure provides an electric machine including a drive assembly and a casing. The drive assembly has a stator and a rotor rotatable about a drive axis relative to the stator. The casing contains the drive assembly and has coolant passages. The coolant passages define a first inlet opening, a second inlet opening, a stator feed circuit, a rotor feed circuit and an intersection providing fluid communication between the stator feed circuit and the rotor feed circuit. The coolant passages receive at least one coolant input through one or more of the first inlet opening and the second inlet opening to deliver coolant to the rotor through the rotor feed circuit and to the stator through the stator feed circuit.

In another aspect, the disclosure provides an electric machine including a drive assembly, a casing and an orifice. The drive assembly has a stator and a rotor rotatable about a drive axis relative to the stator. The casing contains the drive assembly and has coolant passages. The coolant passages define a first inlet opening, a second inlet opening, a stator feed circuit, a rotor feed circuit and an intersection providing fluid communication between the stator feed circuit and the rotor feed circuit. The orifice is disposed within the coolant passages and has a metering port configured to meter a flow of coolant to the stator feed circuit. The coolant passages receive at least one coolant input through one or more of the first inlet opening and the second inlet opening to deliver coolant to the rotor through the rotor feed circuit and to the stator through the stator feed circuit.

The details of one or more embodiments are set forth in the accompanying drawings and the description below. Other features and advantages will become apparent from the description, the drawings and the claims.

BRIEF DESCRIPTION OF THE DRAWINGS

Like reference symbols in the various drawings indicate like elements.

DETAILED DESCRIPTION

Figure 1:
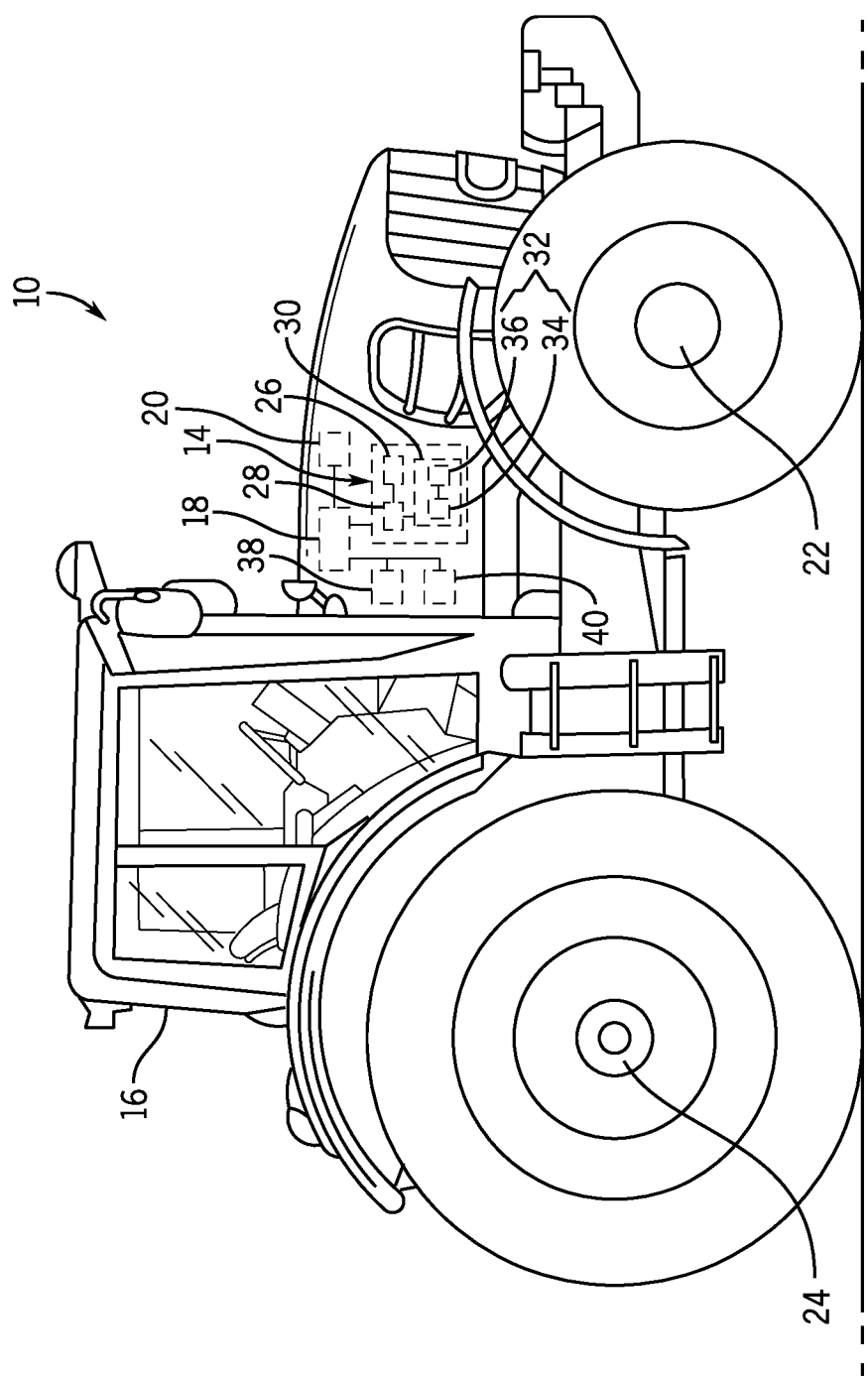
FIG. 1 is a simplified side view of an example work vehicle in the form of an agricultural tractor in which an electric machine may be used in accordance with this disclosure.

The following describes one or more example embodiments of the disclosed electric machine, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "downstream," "upstream,"

"longitudinal," "radial," "axial," "circumferential," "lateral" and "transverse" may be used. Such terms are defined, at least in part, with respect to an electric machine, a passage or circuit for fluid flow, a rotor, a rotating shaft and/or a stator. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached.

Overview

Work vehicles, such as agricultural vehicles, utilize electric machines in a variety of applications onboard the work vehicle and/or in conjunction with attached work implements. These applications may have various different duty cycles with regard to factors such as rotational speed (e.g., revolutions per minute (RPM) of a rotor of the electric machine), operating time, idling time, temperature, power output and variations of these factors. For example, a traction motor may constantly run while the work vehicle is in use with a varying RPM, whereas a work implement actuator may run intermittently at a high RPM or idle for long periods of time at a low RPM. Electric machines may be designed to optimize performance of a drive assembly (e.g., a stator, rotor, rotor magnets, shaft and the like) in one or more of these particular duty cycles. In particular, machine performance may be correlated with cooling performance because the amount of continuous power output may be limited to avoid overheating. To achieve the required cooling demanded of electric machines in certain applications, an electric machine may be designed to dissipate heat via conduction (e.g., a housing of the electric machine in contact with stator coils), convection (e.g., air passing through gaps in components, coolant being directed along components), or combinations thereof.

Generally, to cool an electric machine, a supply of cooling fluid (coolant) (e.g., pressurized oil, air, or the like) may be provided from either an external source (e.g., fluid within a mated component, etc.) or from an internal source (e.g., a fluid circuit of oil in a work vehicle power train, a work vehicle hydraulic system, etc.). Such coolant directly or indirectly absorbs heat from various components of the electric machine, which subsequently flows away from the components. This heat transfer lowers the temperature of the electric machine components, which may improve performance, prevent overheating and improve useful life. The effectiveness of heat transfer may be affected by the volume of coolant, flow rate (e.g., velocity) of coolant, or the location(s) of coolant flow.

A cooling system of an electric machine may be designed to target areas of expected heat generation by routing relatively greater coolant flow across these areas. Such a targeted cooling system may be ineffective in other applications with other duty cycles. Certain conventional work vehicles may utilize a variety of different electric machines and/or different cooling systems for different applications. These different electric machines and/or different cooling systems result in additional costs for manufacturing (e.g., design, production tooling, inventory) and for repair/replacement. Other conventional work vehicles may utilize a general-purpose electric machine for different applications. However, such general-purpose electric machines may not cool as effectively as targeted designs, resulting in poorer performance and a shorter useful life. Additionally, ineffective cooling may result in higher material costs because the parts of the electric machine must withstand higher operating temperatures.

This disclosure provides an electric machine for use in a work vehicle that addresses these and other aspects of conventional arrangements. The electric machine is capable of achieving the requisite cooling characteristics of multiple applications without redesigning or modifying the housing, rotor feed circuit, or stator feed circuit. In another sense, the cooling characteristics of the electric machine are capable of being defined after the electric machine has been manufactured. Likewise, the cooling characteristics may be changed without changing significant components of the electric machine (e.g., housing, stator and rotor). Additionally, the disclosure further provides an electric machine where the flow of coolant to a particular area may be defined by an orifice having a metering port. The metering port is dimensioned such that a desired flow rate of coolant occurs downstream in a desired area of a cooling circuit (e.g., stator feed circuit or rotor feed circuit).

In certain embodiments, the disclosed electric machine may be an electric motor with a housing containing a drive assembly including a stator and rotor, the rotor being rotatable about a drive axis relative to the stator. The housing defines coolant passages including a rotor feed circuit and a stator feed circuit that respectively direct coolant flow toward the rotor and stator. The rotor feed circuit has an outer passage that extends axially along the housing to an end radial passage extending toward the center of the electric motor. The end radial passage connects to a coolant passage extending through a rotor shaft and subsequently to radial passages that extend toward permanent magnets of the rotor. The stator feed circuit has one or more serpentine passages defined in an inner periphery of the housing to pass coolant along an outer periphery of windings of the stator. The stator feed circuit is in communication with a spray ring that sprays coolant onto end turns of windings of the stator.

In certain embodiments, the electric machine includes a unitary housing (e.g., a cast metal housing) with coolant passages integrally formed as part of the housing. The coolant passages define in fluid communication a first inlet opening, a second inlet opening, a stator feed circuit and a rotor feed circuit. One or both of the first inlet opening and the second inlet opening may receive a coolant input. When one of the first or second inlet opening is used, the other inlet opening may be blocked or may be used as an outlet. The electric machine thus provides a housing that is cost-effective to manufacture as a one-piece unit including multiple feed circuits.

In one aspect, the disclosed electric machine may be configurable with regard to a source of flow. To allow for customization, the electric machine may have two separate inlets feeding the coolant system. Certain embodiments may allow coolant input from a first inlet, such as at an axial end of the housing, or from a second inlet, such as located between axial ends of the housing. The electric machine may be supplied with coolant via either one or both of the separate inlets. If only one inlet is used, the other inlet may be blocked (e.g., capped). Each of the first and second inlets may be in fluid communication with both a rotor feed circuit and a stator feed circuit. In this manner, the electric machine is readily adaptable to different sources and/or types of coolant flow without redesign or significant change to manufacturing processes. Certain other embodiments may allow the primary inlet to function as an outlet.

In another aspect, the cooling system may have an orifice mounted in the coolant passages to meter the amount of coolant flow to a portion of the electric machine, such as a stator feed circuit. The orifice may include a metering port to control the flow rate (i.e., velocity) and volume of coolant flow therethrough. In certain embodiments, the orifice and metering port are positioned upstream from a stator feed circuit to meter a coolant flow to the stator circuit. The metering port may also control the flow rate and volume of coolant flow to the rotor feed circuit due to fluid communication between the stator and rotor feed circuits. The orifice may be a unitary part of the housing or it may be removable and replaceable with another orifice having a different sized metering port. Thus, the disclosed electric machine may be reconfigured by only changing one relatively small part that is externally accessible.

In yet another aspect, the coolant system of the disclosed electric machine may be configured to provide a desired coolant flow characteristic downstream (e.g., in a stator feed circuit and/or a rotor feed circuit) via an orifice with a metering port as noted above. In certain example embodiments, a stator feed circuit includes a spray ring for cooling a portion of the stator such as end turns of conductive coils. Such a spray ring requires a specific coolant flow velocity to optimize performance. In particular, if the velocity is too low, the coolant may not spray far enough to reach the end turns, and if the velocity is too high, the coolant may vaporize and/or deflect off the end turns with minimal heat transfer. With a proper coolant flow velocity, the coolant from the spray ring spreads across the end turns in a sheet-like or generally laminar flow, which maximizes the surface area contact of the coolant and thereby heat transfer. The metering port may be sized to allow the required flow for a particular application to result in the proper coolant flow velocity at the spray ring. In this sense, the coolant flow velocity and spray ring performance are functions of the size of the metering port of the orifice.

The cooling system is configurable for improved cooling of the stator, the rotor and other high heat areas of the electric machine, thereby serving to prolong the operational life of the electric machine. The disclosed electric machine also may provide significant manufacturing cost savings. With a configurable cooling system, one electric machine design may be used in a variety of applications with different duty cycles and different cooling requirements, reducing inventory demands, assembly line setup and material costs.

The following describes one or more example implementations of the disclosed electric machine. Discussion herein may sometimes focus on the example application of a cooling subsystem for an electric machine mated to a transmission of an agricultural tractor, but the disclosed powered axle is applicable to other types of mated components and work vehicles, including various other agricultural machines (e.g., combines, harvesters, balers, mowers) as well as various agriculture or forestry machines (e.g., loaders, scrapers, articulated dump trucks, forestry skidders and so on) and utility vehicles. Also, while the following describes the electric machine in the context of a traction motor, aspects of the disclosure are applicable to electric machines for other applications, especially generators and non-traction motors. In particular, additional example applications include powered wheel axles or electrification of hydraulic systems such as hydraulic front-end loaders or proportional-integral (PI) controlled valves.

Example Embodiments of Electric Machine

Referring to FIG. 1, in some embodiments, the disclosed work vehicle 10 may be an agricultural tractor although, as noted, the electric machine described herein may be applicable to a variety of machines, such as construction vehicles, forestry vehicles and other agricultural vehicles. As shown, the work vehicle 10 may be considered to include a structural main frame or chassis 12, a power train 14, an operator platform or cabin 16, a control system 18 and a hydraulic system 20. The work vehicle 10 may be supported off the ground by ground-engaging wheels or tracks. In the illustrated example, the work vehicle 10 includes a front axle (not shown) mounting steerable wheels 22 (one at each left/right lateral side of the work vehicle 10) and a rear axle (not shown in FIG. 1) mounting wheels 24 (one or more at each left/right side of the work vehicle 10).

Generally, the power train 14 has wheel steering components 26, including various devices (e.g., power steering pumps and lines, steering mechanisms, and the like) that couple manual (e.g., operator steering controls or wheel) and/or automated (via the control system 18) steering input to the wheels, such as the steerable wheels 22. The power train 14 includes a source of propulsion, such as an engine 28, which supplies power to the work vehicle 10, as either direct mechanical power or after being converted to electric or hydraulic power. In one example, the engine 28 is an internal combustion engine, such as a diesel engine, that is controlled by an engine control module (not shown) of the control system 18. It should be noted that the use of an internal combustion engine is merely an example, as the source of propulsion may be a fuel cell, an electric motor, a hybrid-gas electric motor, or other power-producing devices. A transmission 30 is included in the power train 14 to mechanically transfer power from the engine 28 to one or more of the wheels 22, 24.

In the illustrated embodiment, the transmission 30 is a variable transmission referred to as an infinitely variable transmission ("IVT") that includes an electric power path to the transmission 30 in addition to the mechanical power path from the engine 28. The transmission 30 includes a continuously variable power source ("CVP") 32 for providing the electric power path. The CVP 32 uses a first electric machine 34 and a second electric machine 36 that may be arranged as a motor-generator pair with the first electric machine 34 acting as a generator and the second electric machine 36 acting as a motor that outputs to the transmission 30. The transmission 30 is capable of receiving power from either one or both of the engine 28 and the CVP 32. For example, the transmission may include a variator gearbox (not shown) implementing one or more planetary gear sets, gear components, and the like. The variator gearbox may provide configurations that combine the power outputs of the engine 28 and the CVP 32 or only transfer power output from either the engine 28 or the CVP 32, resulting in multiple gearing configurations that couple the engine 28 and/or the CVP 32 to one or more of the wheels 22, 24. As a result, for different operating conditions (e.g., driving speed, torque, forward or reverse direction, auxiliary power drawn to actuate a work implement, and the like) of the work vehicle 10, the transmission 30 selectively transmits useful power in multiple modes, such as: an engine-only mode, a CVP-only mode, or a split-mode from both the engine 28 and the CVP 32. The first and second electric machines 34, 36 of this example will experience different duty cycles and may have different areas of internal heat generation. Nonetheless, in view of the below, the first and second electric machines 34, 36 may be constructed of substantially the same components while cooling characteristics are separately configured for the particular expected heat generation within each respective electric machine.

In addition to providing tractive power to propel the work vehicle 10, the engine 28 may provide power to various onboard subsystems (including initial drive power to the CVP 32), including various electrical and hydraulic components of the work vehicle, and for off-boarding power to other sub-systems remote from the work vehicle 10. For example, the engine 28 may provide mechanical power that is converted to an electric format to run the electronics of the control system 18 and one or more electric drives of the work vehicle 10. The control system 18 thus may have mechanical to electrical power conversion components 38, one or more batteries 40, and associated electronics, including various alternators, generators, voltage regulators, rectifiers, inverters, and the like. The engine 28 may also provide mechanical power that is converted to hydraulic format to power various pumps and compressors that pressurize fluid to drive various actuators of the hydraulic system 20 in order to power wheel steering and braking and various work implements onboard the work vehicle 10. In this example, the work vehicle 10 may support the mounting of work implements (not shown, e.g., a front loader that may be raised and lowered during operation by one or more hydraulic piston-cylinder devices, a tow-behind work implement, or the like). The hydraulic system 20 may be coupled to and operated by the control system 18 in response to commands from an operator input device (e.g., operator controls, operator display device, etc.) in the cabin 16 or remote from the work vehicle 10. The hydraulic system 20 may include other components (e.g., valves, flow lines, pistons/cylinders, seals/gaskets, and so on), such that control of various devices may be effected with, and based upon, hydraulic, mechanical, or other signals and movements.

The control system 18 may be configured as a computing device with associated processor devices and memory architectures, as a hard-wired computing circuit (or circuits), as a programmable circuit, as a hydraulic, electrical, or electro-hydraulic controller. The control system 18 may be configured to execute various computational and control functionality with respect to the work vehicle 10, including various devices associated with the power train 14, the hydraulic system 20, and various additional components of the work vehicle 10. In some embodiments, the control system 18 may be configured to receive input signals in various formats (e.g., as hydraulic signals, voltage signals, current signals, and so on), and to output command signals in various formats (e.g., as hydraulic signals, voltage signals, current signals, mechanical movements such as rotation, and so on). The control system 18 is configured to operate various aspects of the disclosed electric machine, which may form part of the power train 14 or part of another subsystem of the work vehicle 10.

Figure 2:
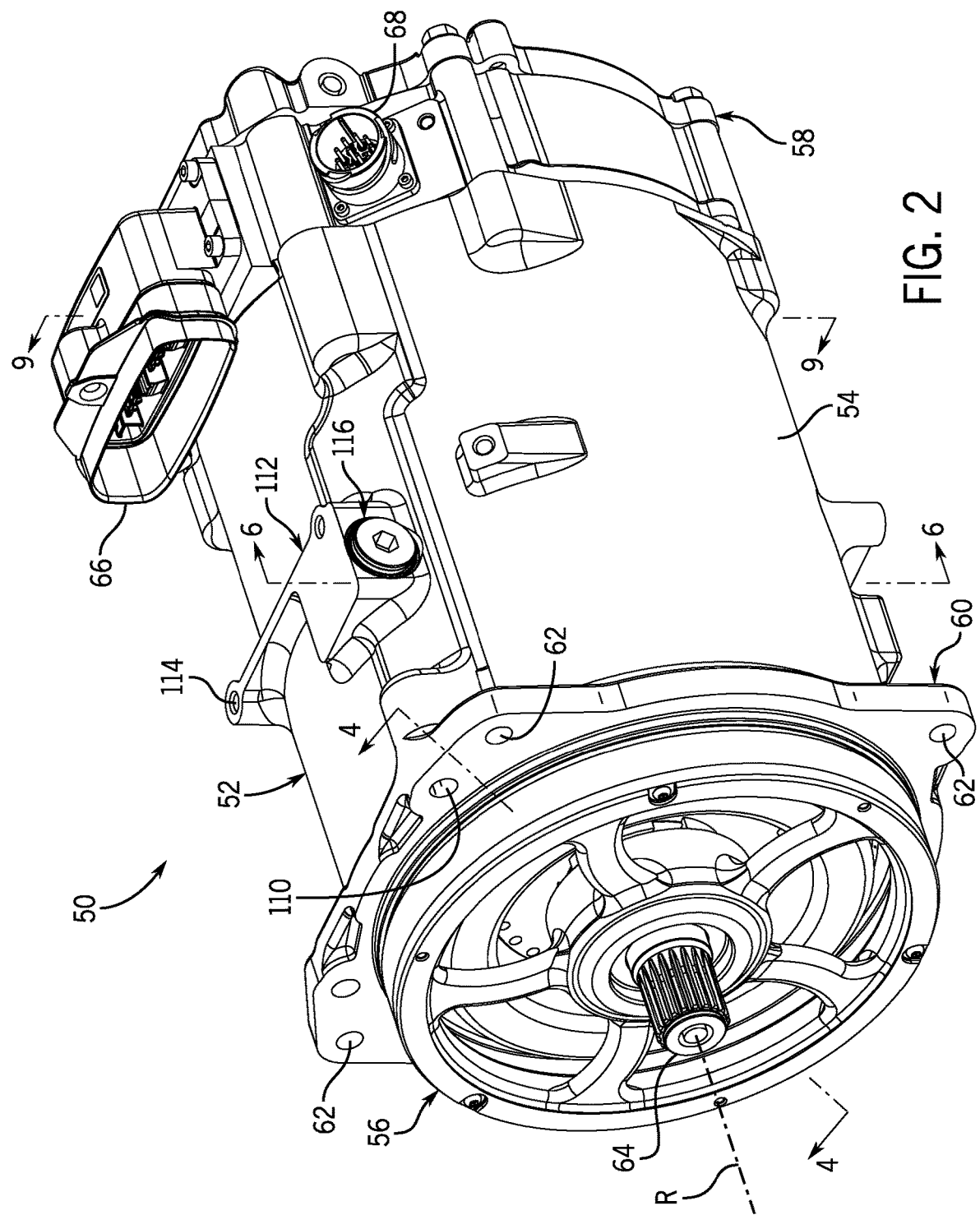
FIG. 2 is an isometric view of an example electric machine for the example work vehicle of FIG. 1.

Referring also to FIG. 2, an example electric machine 50 is shown and is applicable to the first electric machine 34 and/or the second electric machine 36 discussed above, as well as various alternative electric machine applications. The electric machine 50 has a casing 52 that is a hollow annular (e.g., cylindrical) shape with an exterior peripheral surface 54 and extending about an axial reference axis R (e.g., a drive axis) from a first axial end (e.g., a drive end 56) to a second axial end (e.g., a non-drive end 58). The drive end 56 may include a mounting flange 60 with a plurality of mounting bores 62 for attachment (e.g., via bolts) to a fixed part of the transmission 30 (e.g., a housing or the like) or another nearby component. The drive end 56 also includes an output shaft 64 for delivering or receiving rotational power. One or more connectors 66, 68 are arranged on the casing 52 for various purposes, such as supplying power from the power train 14 or batteries 40 of the work vehicle 10 and providing wired electrical connection with the control system 18.

Figure 4:
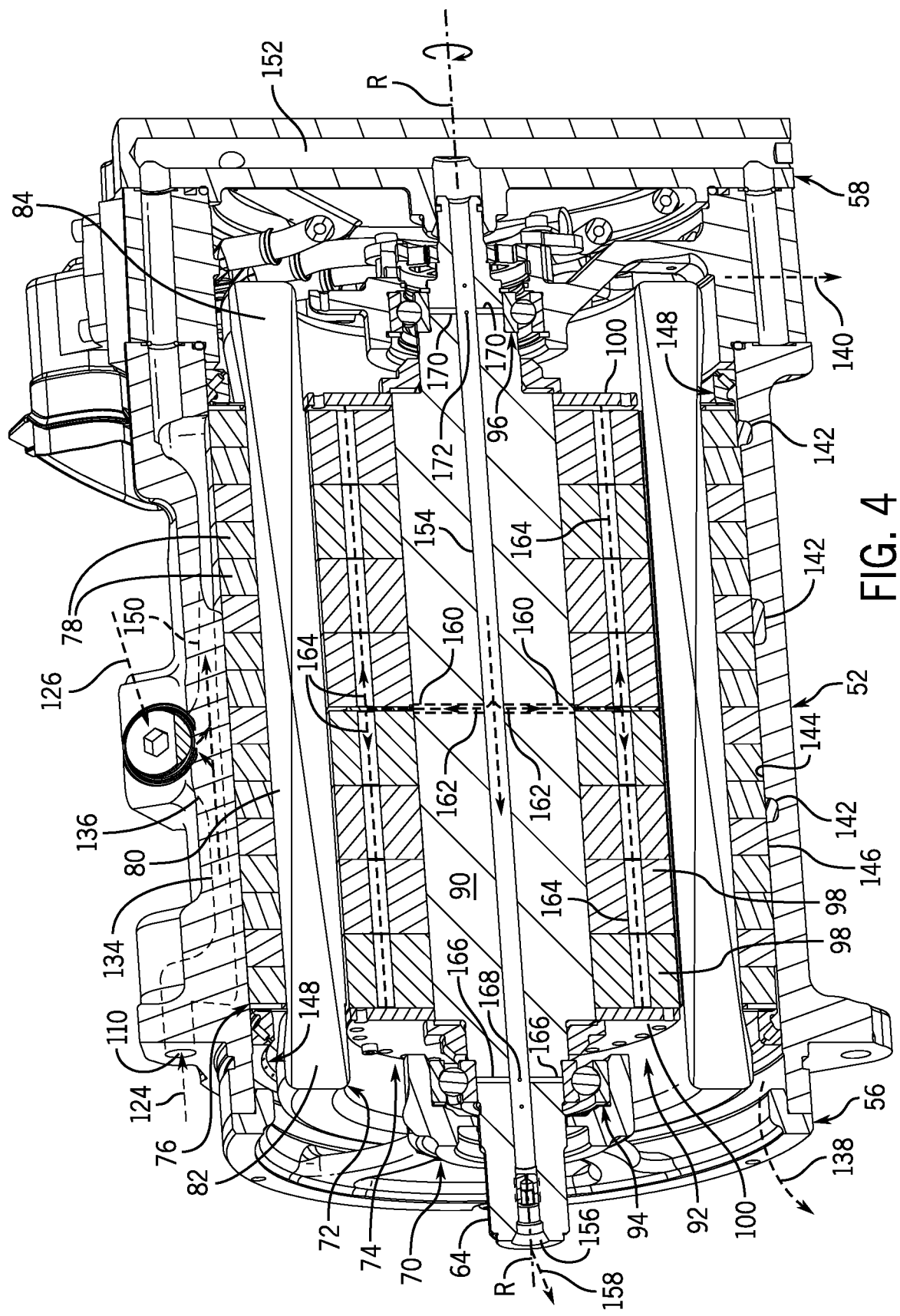
FIG. 4 is a cross-sectional view of the example electric machine taken at plane 4-4 of FIG. 2.
Figure 5:
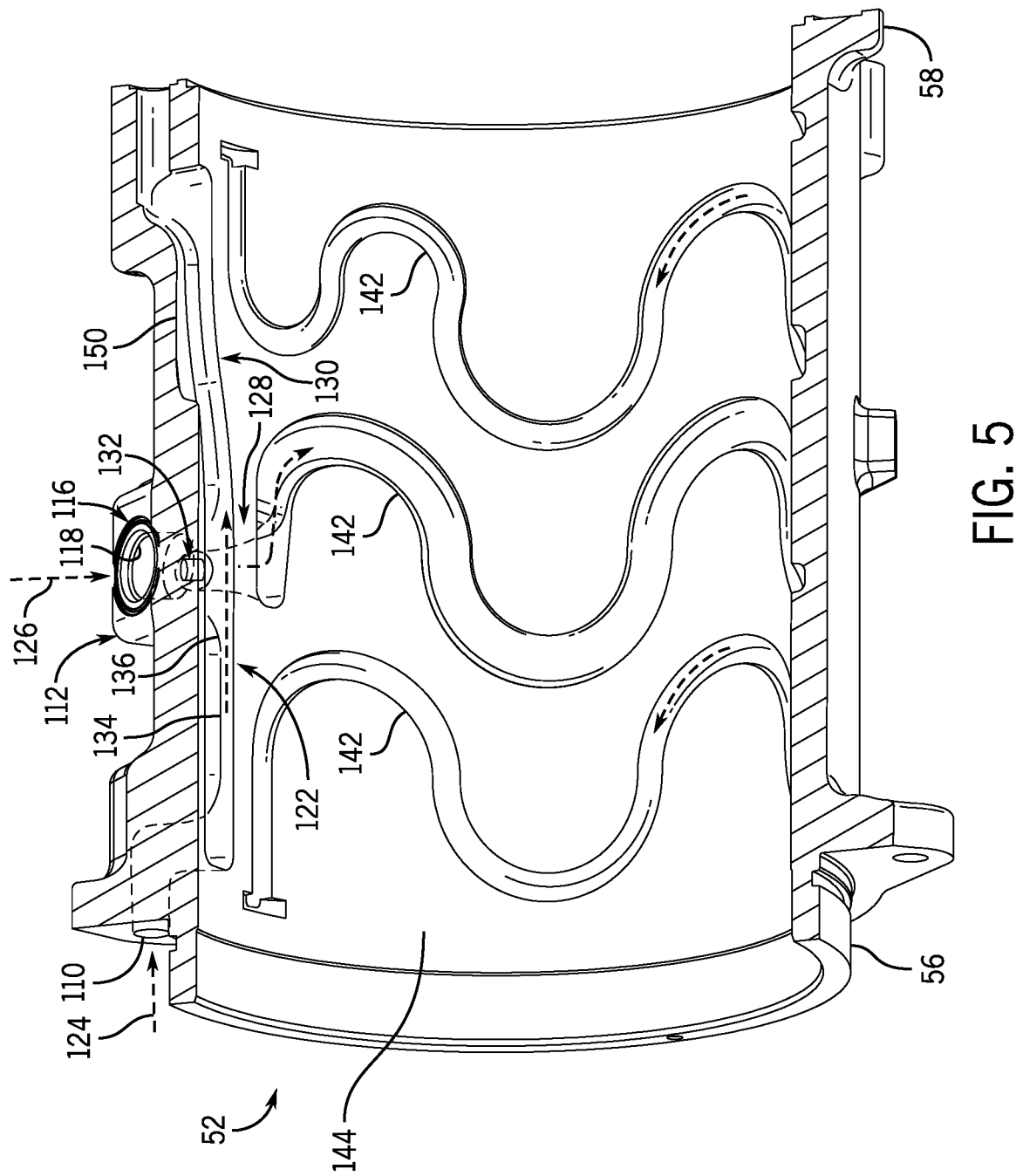
FIG. 5 is a partial cross-sectional view similar to FIG. 4 with certain parts removed.
Figure 6:
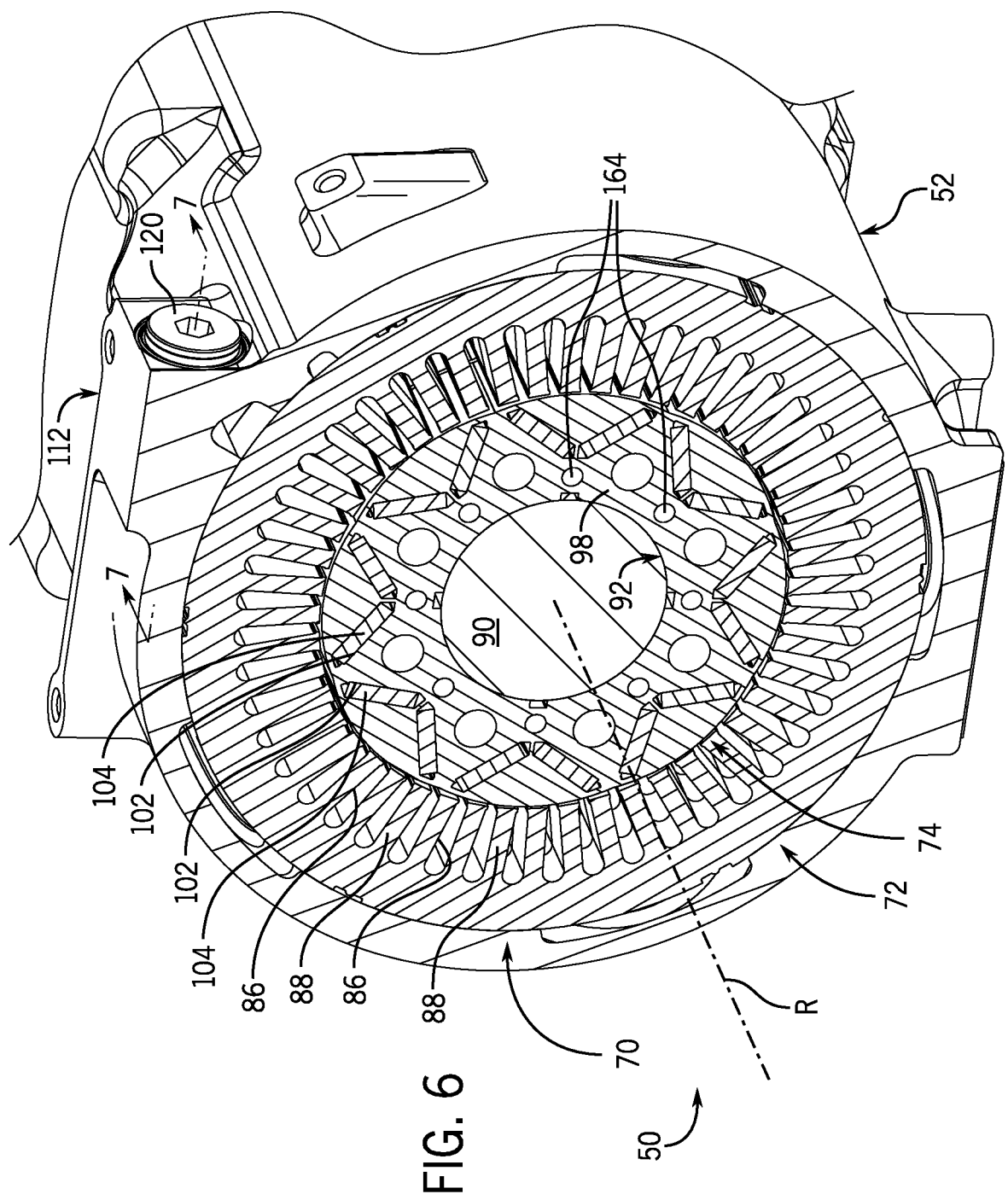
FIG. 6 is a partial cross-sectional isometric view of the example electric machine taken at plane 6-6 of FIG. 2.

Referring also to FIGS. 3-6, the electric machine 50 may be a permanent magnet motor with a drive assembly 70 including a stator 72 and a rotor 74. The stator 72 includes a lamination stack 76 formed from a plurality of laminations 78, although in other examples (not illustrated) the stator 72 may comprise a solid or split core material. The plurality of laminations 78 are a ferromagnetic material arranged in an annular shape to be coaxially aligned with each other about the rotor 74. The stator 72 further includes wire coils 80 positioned (e.g., wrapped about) radially inner portions of the plurality of laminations 78. The wire coils 80 include axial end turns 82, 84 that extend axially beyond the plurality of laminations 78. In some applications, such as high torque, low speed applications, the wire coils 80 may be a significant source of concentrated heat generation. As shown in FIG. 6, a plurality of slots 86 and a plurality of protrusions 88 are arranged at a radially inner portion of each of the plurality of laminations 78. The plurality of slots 86 may be symmetrical and evenly circumferentially spaced about the reference axis R. When assembled, the wire coils 80 of the stator 72 are mounted in the plurality of slots 86 and wrapped around one or more of the plurality of protrusions 88.

The rotor 74 has a rotor shaft 90 that may be an integral part of or coupled to the output shaft 64 configured for co-rotation about the reference axis R. The rotor 74 also includes a rotor core 92 mounted for co-rotation with the rotor shaft 90. The rotor shaft 90 may be supported for rotation relative to the casing 52 by one or more bearings, for example a first roller bearing assembly 94 and a second roller bearing assembly 96 respectively mounted at the drive end 56 and the non-drive end 58. The rotor core 92 is formed from a plurality of rotor laminations 98. End plates 100 are provided at each axial end of the rotor 74 to encapsulate the plurality of rotor laminations 98.

As shown in FIG. 6, each of the plurality of rotor laminations 98 includes a one or magnets, such as a plurality of cavities 102 carrying a plurality of permanent magnets 104, for magnetic field generation. The plurality of permanent magnets 104 are circumferentially spaced about the reference axis R. The plurality of permanent magnets 104 are arranged so that the alternating polarities of the plurality of permanent magnets 104 rotate past the wire coils 80 of the stator 72. In the illustrated example, the plurality of cavities 102 are arranged in a generally V-shaped repeating configuration such that the plurality of permanent magnets 104 are successively positioned with alternating polarities to induce an alternating magnetic field when the rotor 74 rotates. In applications with high rotational velocity, the permanent magnets 104 may be a significant source of heat generation.

The casing 52 of the electric machine 50 incorporates various structures for introducing coolant to the electric machine and aiding to distribute coolant about the drive assembly 70. The casing 52 has a first inlet opening 110 at the drive end 56 in the mounting flange 60 and to fluidly couple an interior of the casing 52 to the interior of a mating component (not shown), thereby allowing shared coolant without separate plumbing lines. It will be appreciated that in other examples or applications the first inlet opening 110 may be located at the non-drive axial end 58 or other areas of the electric machine 50. The first inlet opening 110 may selectively provide a coolant input or, in certain alternative examples, provide a coolant output. The casing 52 has an intermediate flange 112 located between the drive end 56 and the non-drive end 58 with one or more bores 114 for additional attachments, for example supplementary mounting of the electric machine 50 or attachment of a mated component that is powered by the electric machine 50. The intermediate flange 112 also includes an external port 116 providing a second inlet opening 118 that is externally closed with a plug 120 and is fluidly coupled with the first inlet opening 110. The casing 52 may be formed as one piece (e.g., integrally formed from the same material at the same time by the same process) with one or more of the mounting flange 60 and the intermediate flange 112.

The casing 52 of the electric machine 50 includes coolant passages 122 for providing a flow of coolant fluid (e.g., liquid oil) throughout the electric machine 50. The coolant passages 122 include the first inlet opening 110 and the second inlet opening 118 for receiving one or more of a first coolant inputs 124 and a second coolant input 126. The coolant passages 122 also include a stator feed circuit 128 and a rotor feed circuit 130. An orifice 132 is positioned in the external port 116 to meter coolant flow to the stator feed circuit 128 (and in effect, also to meter flow to the rotor feed circuit 130). In the illustrated example, an upstream passage 134 of the coolant passages 122 extends from the first inlet opening 110 to an intersection 136 that leads toward the orifice 132 and the second inlet opening 118. It will be appreciated that the intersection 136 along with the intermediate flange 112 may be positioned at any axial location along the casing 52 between the drive end 56 and the non-drive end 58. It will also be appreciated that used coolant from the stator feed circuit 128 and the rotor feed circuit 130 may flow to either of the axial ends (drive end 56 and non-drive end 58) of the casing 52 and exit as a drive end drain flow 138 or a non-drive end drain flow 140.

Figure 3:
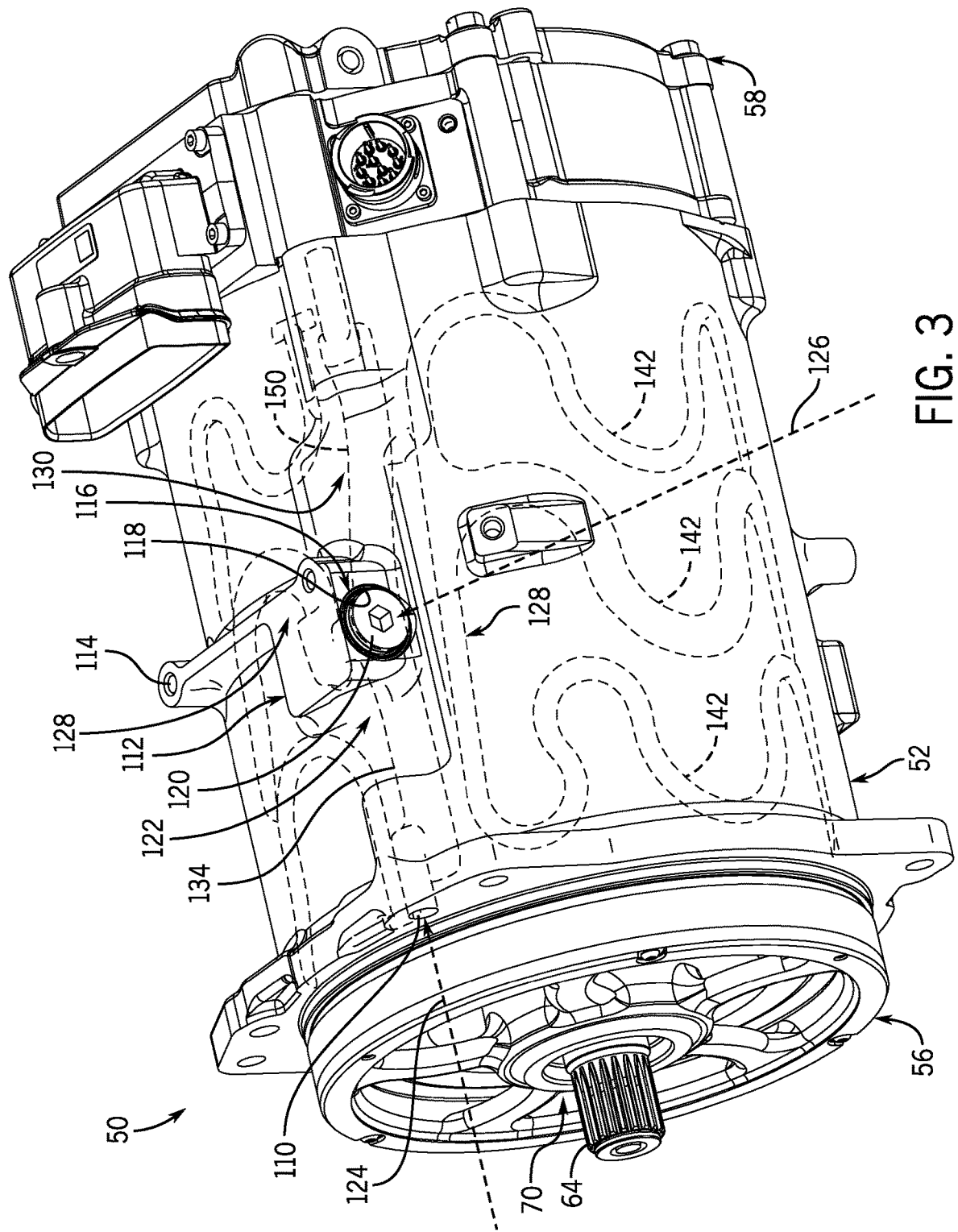
FIG. 3 is a view similar to FIG. 2 showing certain internal components in relief.

The rotor feed circuit 130, as illustrated in FIG. 3, initially extends axially away from the intermediate flange 112 toward the non-drive end 58 of the electric machine 50. The stator feed circuit 128 initially extends about a perimeter of the casing 52 with serpentine coolant passages 142 in multiple branches spaced axially. Because of the fluid interconnection of the stator feed circuit 128 and the rotor feed circuit 130 at the intersection 136, the stator feed circuit 128 may be considered to include the first inlet opening 110, the upstream passage 134, and the second inlet opening 118. Alternatively, the rotor feed circuit 130 may be considered to include the first inlet opening 110, the upstream passage 134, and the second inlet opening 118.

The serpentine coolant passages 142 of the stator feed circuit 128 are formed on an interior peripheral surface 144 of the casing 52, as shown in FIG. 5 and shown in relief in FIG. 3. With this arrangement, coolant flow through the serpentine coolant passages 142 flows along in physical contact with an outer periphery 146 of the plurality of laminations 78 of the stator 72 for direct convective cooling. In the illustrated example with three branches of the serpentine coolant passages 142, a substantial contact area is provided between coolant in the stator feed circuit 128 and the outer periphery 146 of the plurality of laminations 78 resulting in significant cooling. The serpentine coolant passages 142 may subsequently connect to one or more spray rings 148 (see FIG. 4) for cooling of the axial end turns 82, 84 of the wire coils 80 of the stator 72.

The rotor feed circuit 130 is arranged to transfer one or more of the first and second coolant inputs 124, 126 from the first inlet opening 110 and/or the second inlet opening 118 to and through the rotor 74. To accomplish this, the rotor feed circuit 130 has an outer axial passage 150 extending axially from the second inlet opening 118 toward the non-drive end 58 of the electric machine 50. Subsequently at the non-drive end 58, an end radial passage 152 extends radially inward toward the rotor 74. An axial coolant passage 154 extends through the rotor shaft 90 and along the reference axis R. The axial coolant passage 154 terminates at an outlet 156 of the rotor shaft 90 with a coolant outflow 158, which may serve as spline lube for the output shaft 64 or for other cooling downstream from the output shaft 64 outside electric machine 50.

The rotor feed circuit 130 branches off from the axial coolant passage 154 to deliver coolant to the rotor core 92. In particular, one or more radial passages 160 intersect the axial coolant passage 154 at corresponding core ports 162 and extend into the rotor core 92. Continuing from the one or more radial passages 160, the rotor core 92 includes axial coolant passages 164 to allow coolant to flow in both axial directions away from the one or more radial passages 160. The axial coolant passages 164 are circumferentially interspersed with each V-shape of the plurality of cavities 102 to deliver coolant axially throughout the rotor core 92 and among the plurality of rotor laminations 98. Accordingly, the axial coolant passage 154 of the rotor shaft 90 routes coolant to the one or more radial passages 160 which route coolant to the plurality of permanent magnets 104 in the rotor core 92, which may be a location of concentrated heat generation in some applications of the electric machine 50 with high rotational velocities. The end plates 100 allow coolant outflow from the rotor feed circuit 130 and provide conductive cooling from the rotor 74. The rotor feed circuit 130 may also provide coolant passages to the first roller bearing assembly 94 and the second roller bearing assembly 96. In the illustrated example, one or more first bearing radial passages 166 intersect the axial coolant passage 154 at corresponding first bearing ports 168 and extend toward the first roller bearing assembly 94. Similarly, one or more second bearing radial passages 170 intersect the axial coolant passage 154 at corresponding second bearing ports 172 and extend toward the second roller bearing assembly 96.

Figure 7:
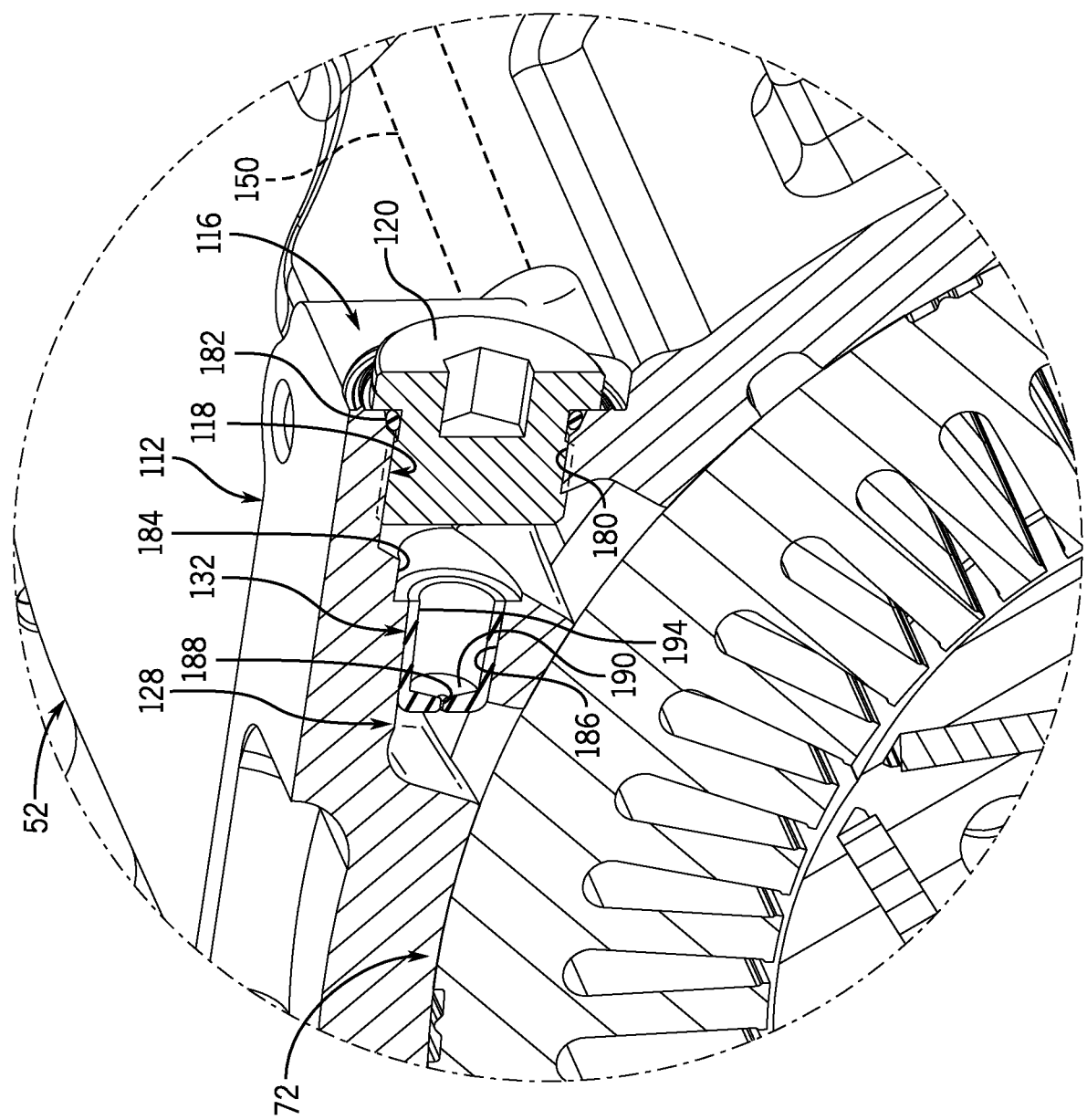
FIG. 7 is an enlarged detail view of an inlet of the example electric machine taken at area 7-7 of FIG. 6.
Figure 8:
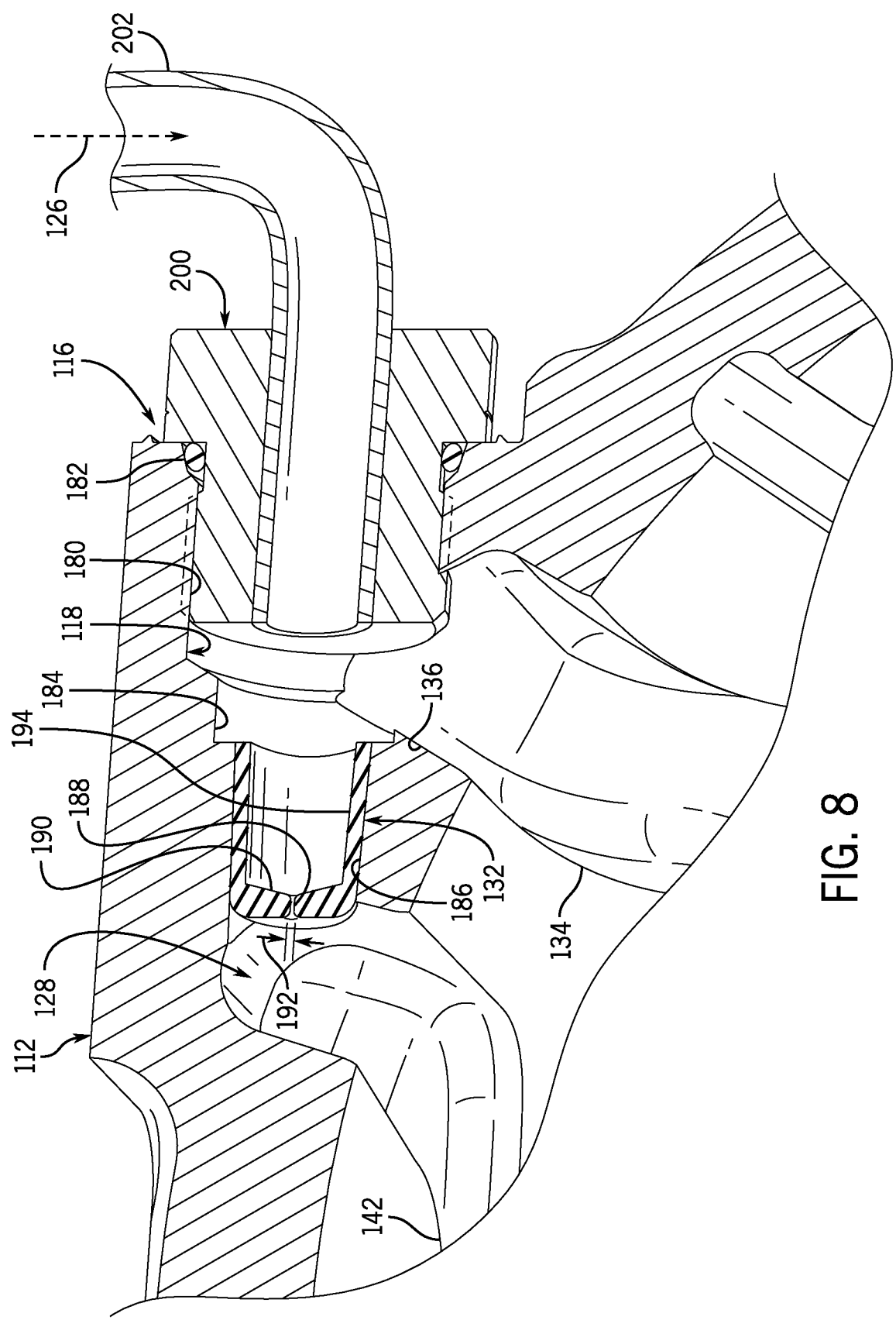
FIG. 8 is a further enlarged view thereof with a hose attachment.

Referring also to FIGS. 7 and 8 the plug 120 is fit in an upper region 180 of the second inlet opening 118 and provided with a fluid seal 182, such as a resilient gasket or O-ring. The plug 120 terminates before a mid-region 184 of the second inlet opening 118. The orifice 132 is mounted (e.g., press fit) in the second inlet opening 118 at a lower region 186 thereof. The lower region 186 may have a reduced diameter relative to the mid-region 184 or the upper region 180. The orifice 132 may be formed of a polymeric material providing a sealing friction fit with the lower region 186.

The orifice 132 has a metering port 188 formed in a floor 190. The metering port 188 is sized to provide a predetermined desired flow rate of coolant through the stator feed circuit 128 and/or the rotor feed circuit 130. In one example discussed in detail below, the metering port 188 is sized with a diameter 192 to provide a sufficient flow of coolant throughout the stator feed circuit 128 such that a flow in the one or more spray rings 148 provides desired spray and cooling characteristics to the axial end turns 82, 84 of the stator 72. As shown, the floor 190 of the orifice 132 tapers in thickness toward the metering port 188 and the floor 190 is thicker than upright walls 194 of the orifice 132, although other relative sizes and shapes may be implemented.

In other examples, the orifice 132 may be permanently mounted (e.g., adhered or welded) in the lower region 186 or the orifice 132 may be integrally formed as a unitary part of the casing 52 and/or the intermediate flange 112 (e.g., formed from the same material at the same time by the same process). It should be noted that the term "orifice" as used herein denotes a physical structure, which also may be known as a "restriction plate" in removable applications, and the term is not a generic opening in a structure. In particular, an orifice is a structure that includes a dimensioned opening, such as the example metering port 188, or a similar opening (or narrowed area) that produces desired flow characteristics. The example metering port 188 is dimensioned to produce sufficient coolant flow for desired spray from the spray ring 148.

The second coolant input 126 for the electric machine 50 is selectively provided at the external port 116, as depicted in the example of FIG. 8. In this example, a coupler 200 in the upper region 180 attaches a feed line 202 to the second inlet opening 118. The coupler 200 replaces the plug 120 of other illustrated examples. The second coolant input 126, similar to the first coolant input 124, branches proximate to the mid-region 184 of the second inlet opening 118 to flow to both the stator feed circuit 128 via the orifice 132 and to the rotor feed circuit 130 via the intersection 136.

Together, the coolant passages 122 receive one or more of the first coolant input 124 into the first inlet opening 110 and the second coolant input 126 into the second inlet opening 118. Coolant flows to both the stator feed circuit 128 and the rotor feed circuit 130 via the intersection 136. A flow rate into the stator feed circuit 128 is metered by the metering port 178 of the orifice 132, and the balance of coolant passes into the rotor feed circuit 130. Because the coolant flow into the rotor feed circuit 130 is a function of the coolant flow into the stator feed circuit 128, the orifice 132 meters coolant flow to both the rotor feed circuit 130 and the stator feed circuit 128. In use, the orifice 132 is readily (e.g., with manual tools) installed, via the external port 116 (after temporarily removing the plug 120 or the coupler 200). The orifice 132 may also be replaced or removed through the external port 116. As a result, the cooling characteristics of the stator feed circuit 128 and the rotor feed circuit 130 may be configured for different applications without redesigning the electric machine 50 or the coolant passages 122.

For the rotor feed circuit 130 of the illustrated example, coolant flow from one or more of the first coolant input 124 and the second coolant input 126 passes the intersection 136 into the outer axial passage 150. Coolant then flows radially inwardly through the end radial passage 152 to the axial coolant passage 154 of the rotor 74. In the axial coolant passage 154, coolant flows axially toward the drive end 56 while also branching off radially through the one or more radial passages 160, the one or more first bearing radial passages 166, and the one or more second bearing radial passages 170. From the one or more radial passages 160, the coolant flow branches in both axial directions through the axial coolant passage 164, passing through the rotor core 92 and out through openings in the end plates 100. The coolant in the axial coolant passage 154 that does not branch off terminates or exits at the outlet 156 of the output shaft 64.

Figure 9:
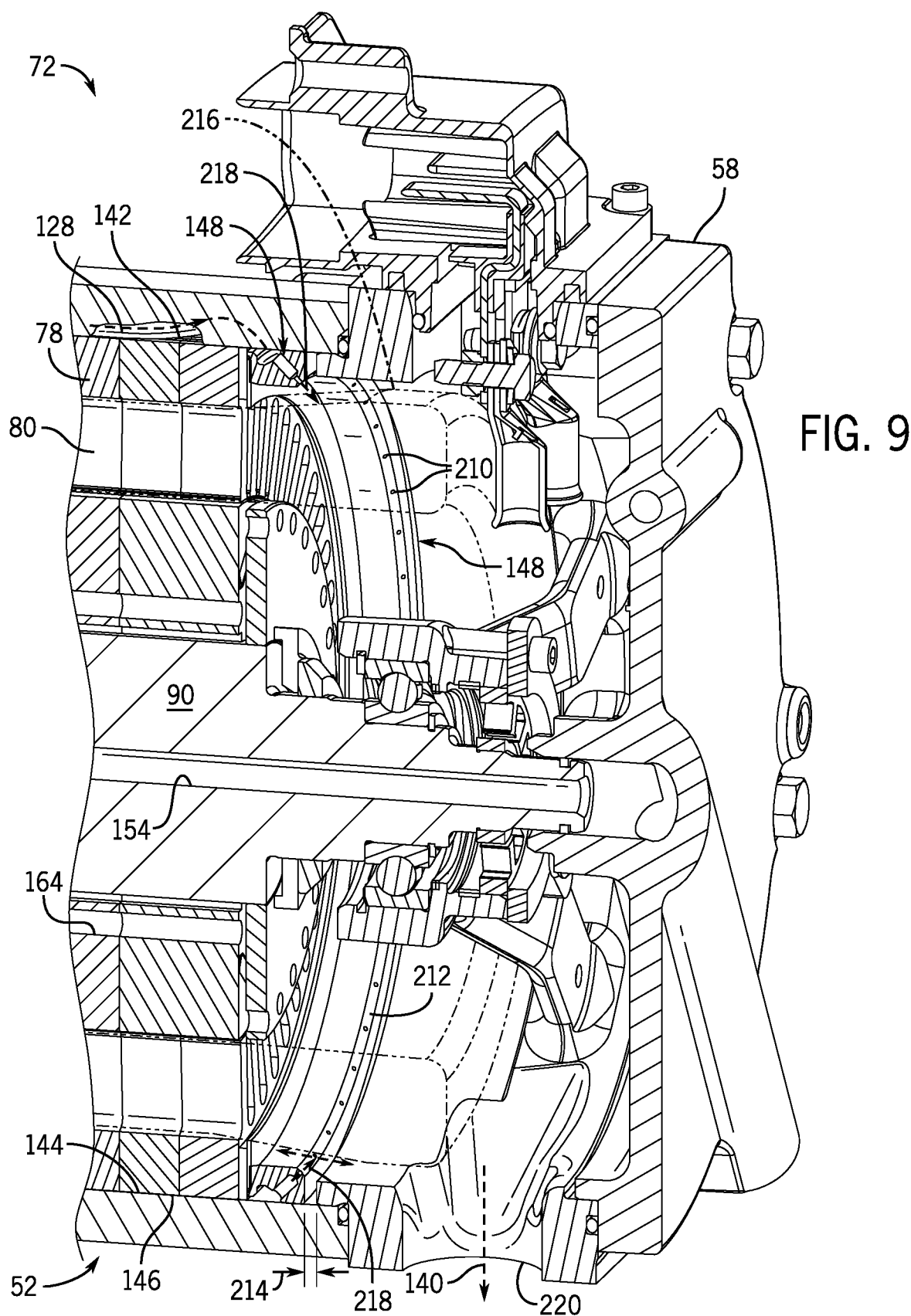
FIG. 9 is a partial cross-sectional view of the example electric machine taken at area 9-9 of FIG. 2.

Referring now also to FIG. 9, the serpentine coolant passages 142 of the stator feed circuit 128 may subsequently connect to the one or more spray rings 148 (see FIG. 4) for additional cooling of the stator 74. The one or more spray rings 148 are mounted axially outside the plurality of laminations 78 of the stator 72 for directing a spray of coolant onto one or more corresponding axial end turns 82, 84. The one or more spray rings 148 are positioned at the interior peripheral surface 144 of the casing 52 and axially beyond the plurality of laminations 78. The one or more spray rings 148 have an annular shape that is coaxial with the reference axis R. A plurality of nozzles 210 are provided about the circumference of the one or more spray rings 148. In the illustrated example, the plurality of nozzles 210 are provided on a chamfered edge 212 at a radially inner and axially outer portion of the one or more spray rings 148. The plurality of nozzles 210 are spaced from the axial end turns 82, 84 of the wire coils 80 by an axial gap 214. The plurality of nozzles 210 are angled relative to reference axis R and relative to an outer periphery 216 of the axial end turns 82, 84 of the wire coils 80 of the stator 72.

The plurality of nozzles 210 of the one or more spray rings 148 are calibrated to provide desired spray and cooling characteristics for cooling the stator 72, for example at the outer periphery 216 of the axial end turns 82, 84. A spray flow 218 from the plurality of nozzles 210 must have sufficiently high velocity to bridge the axial gap 214 but sufficiently low velocity to avoid vaporization in the axial gap 214 and/or avoid deflection of coolant off the axial end turns 82, 84. With the spray flow 218 properly calibrated, coolant will flow along the outer periphery 216 of the axial end turns 82, 84 and spread in a generally sheet-like manner. To this end, in one example, the spray flow 218 may have a velocity of about 1-10 m/s, and in some cases 3-9 m/s, and is provided at an angle of greater than 90 degrees relative to the outer periphery 216 of the axial end turns 82, 84. As noted above, this coolant flow is supplied to the plurality of nozzles 210 via the stator feed circuit 128. The flow rate of coolant through the stator feed circuit 128 is dictated by the diameter 192 of the metering port 188 of the orifice 132. Accordingly, the metering port 188 is sized to impart a spray velocity to the coolant to result in the desired spray and cooling characteristics for the spray flow 218. In other examples, the metering port 188 may be sized to impart a different spray velocity for the spray flow 218 or may be sized to provide particular cooling characteristics in other areas of the stator feed circuit 128 and/or the rotor feed circuit 130.

For the stator feed circuit 128 in the illustrated example, coolant flows to the orifice 132 from one or more of the first coolant input 124 (via the intersection 136) and second coolant input 126. Coolant flows through the metering port 188 of the orifice 132 into the serpentine coolant passages 142. As shown, coolant in the serpentine coolant passages 142 flows about a majority of a circumference of the interior peripheral surface 144 of the casing 52 in an axially central region of the casing, then the serpentine coolant passages 142 branch in both axial directions for coolant to flow about a majority of a circumference of the interior peripheral surface 144 proximate to the drive end 56 and the non-drive end 58 of the casing 52. Subsequently, coolant flows into the one or more spray rings and out the plurality of nozzles 210. Coolant from the plurality of nozzles 210 crosses the axial gap 214 to contact the axial end turns 82, 84 of the wire coils 80. Subsequently, coolant flows axially and may also spread circumferentially along the axial end turns 82, 84 substantially without deflecting from or bouncing off the axial end turns 82, 84.

It should be noted that the view of FIG. 9 is rotated relative to the view of FIG. 4, and the non-drive end 58 of the casing 52 is shown in cross-section. In this view, the non-drive end drain flow 140 is shown passing through a non-drive end outlet opening 220 formed in the casing 52. A similar drive end drain outlet opening (not shown) may be formed in the drive end 56 of the electric machine 50.

The foregoing describes one or more example electric machines in detail. Various other configurations are possible within the scope of this disclosure, including configuring the electric machine as a generator instead of as a motor. For example, the above-described electric machine utilizes the first or second inlet openings for receiving a cooling fluid supply. However, the electric machine may be configured with one of the first and second inlet openings serving as an outlet for cooling fluid. Additionally, the first inlet opening may be provided at either axial end (drive end or non-drive end). The drive end of the electric machine may be considered a first axial end or a second axial end. Moreover, the electric machine may be implemented for a variety of applications within a given work vehicle. The electric machine may also be implemented in other vehicles, other work vehicles, or other industrial applications. Onboard a work vehicle, the electric machine may have various locations and applications, including one or more electric machines powering a wheel axle. The electric machine may also supplement hydraulic systems and components such as hydraulic front-end loaders or proportional-integral (PI) controlled hydraulic valves. Although two electric machines are discussed for implementation with a transmission, other numbers of electric machines may be used in this type of application, including one, three, or more electric motors.

Enumerated Examples of Electric Machine

Also, the following examples are provided, which are numbered for easier reference.
1. An electric machine including: a drive assembly including a stator and a rotor rotatable about a drive axis relative to the stator; and a casing containing the drive assembly and having coolant passages, the coolant passages defining a first inlet opening, a second inlet opening, a stator feed circuit, a rotor feed circuit, and an intersection providing fluid communication between the stator feed circuit and the rotor feed circuit; wherein the coolant passages receive at least one coolant input through one or more of the first inlet opening and the second inlet opening to deliver coolant to the rotor through the rotor feed circuit and to the stator through the stator feed circuit.
2. The electric machine of example 1, further comprising an orifice in the coolant passages proximate the second inlet opening.
3. The electric machine of example 2, wherein the orifice is removably mounted in the casing.
4. The electric machine of example 2, wherein the orifice is formed integrally as a unitary part of the casing.
5. The electric machine of example 1, wherein the first inlet opening is in an axial first end of the casing; and wherein the rotor feed circuit includes an outer axial passage in the casing extending from the intersection to an end radial passage at a second axial end of the casing, the end radial passage extending to the rotor.
6. The electric machine of example 1, wherein the casing includes an annular body with an interior peripheral surface in contact with an outer periphery of the stator; and wherein the stator feed circuit defines one or more serpentine coolant passages that, at least in part, are recessed in the interior peripheral surface and in which the coolant is routed across the outer periphery of the stator.
7. The electric machine of example 1, further including a spray ring disposed about the drive axis within the casing at an axial end of the casing, the spray ring having coolant passages leading from one or more inlet openings to one or more spray outlets, the one or more inlet openings being in fluid communication with the stator feed circuit of the casing.
8. The electric machine of example 7, wherein the spray ring is spaced from the stator by an axial gap extending along the drive axis; and wherein the spray ring sprays the coolant from the one or more spray outlets across the axial gap to the stator.
9. The electric machine of example 8, further comprising an orifice disposed within the coolant passages and having a metering port that is sized to impart a spray velocity to the coolant sufficient for the coolant to span the axial gap and contact the stator.
10. The electric machine of example 9, wherein the metering port of the orifice is sized so that the spray velocity is low enough to avoid vaporization of the coolant and deflection of the coolant off the stator.
11. The electric machine of example 1, wherein the casing has a first axial end configured to mount a drive unit; wherein the first inlet opening is an internal opening disposed in the first axial end of the casing and opens to an internal volume at the first axial end of the casing between the drive unit and casing.
12. The electric machine of example 11, wherein the casing includes an annular body with an exterior periphery; and wherein the second inlet opening is an external opening through the exterior periphery of the annular body of the casing.
13. In further embodiments, an electric machine is provided that includes: a first wheel having a first wheel hub; a second wheel having a second wheel hub aligned along a common wheel axis with the first wheel; and a powered axle. The powered axle includes: an axle housing; an axle hub mounted to the axle housing; an output hub; one or more wheel bearings supporting the output hub for rotation about the axle hub along a rotation axis. The powered axle also includes: an electric drive disposed, at least in part, within the axle housing; a hub gear set disposed, at least in part, within the axle hub and configured to transmit power from the electric drive to the output hub for rotation of the first wheel hub and the second wheel hub; and a wheel brake disposed radially between the axle hub and the output hub and axially, at least in part, between the first wheel hub and the second wheel hub, the wheel brake configured to selectively permit and arrest rotation of the output hub.
14. The electric machine of example 13, wherein the casing has an annular body with an exterior periphery and a first axial end configured to mount a drive unit; wherein the first inlet opening is an internal opening disposed in the first axial end of the casing and opens to an internal volume at the first axial end of the casing between the drive unit and casing; and wherein the second inlet opening is an external opening through the exterior periphery of the annular body of the casing.
15. The electric machine of example 13, further including a spray ring disposed about the drive axis within the case at an axial end of the casing, the spray ring having coolant passages leading from one or more inlet openings to one or more spray outlets, the one or more inlet openings being in fluid communication with the stator feed circuit of the casing; wherein the spray ring is spaced from the stator by an axial gap extending along the drive axis and the spray ring sprays the coolant from the one or more spray outlets across the axial gap to the stator; and wherein the metering port is sized to impart a spray velocity to the coolant sufficient for the coolant to span the axial gap and contact the stator while avoiding vaporization of the coolant and deflection of the coolant off the stator.

CONCLUSION

The examples discussed above result in a variety of benefits of the disclosed electric machine. For example, the cooling system provides improved cooling features throughout both the stator and the rotor and from a single source. The first and second inlet openings allow for customized use with various coolant input/output arrangements in a variety of applications. The electric machine may afford a cooling system that is customizable in various ways to provide optimal cooling for different applications. At the same time, significant components of the electric machine (e.g., housing and drive assembly) are unchanged, resulting in significant cost savings and in simplification of manufacturing.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications and variations on the described example(s). Accordingly, various embodiments and implementations other than those explicitly described are within the scope of the following claims.

What is claimed is:

1. An electric machine, comprising:
   a drive assembly including a stator and a rotor rotatable about a drive axis relative to the stator; and
   a casing containing the drive assembly and having coolant passages, the coolant passages defining a first inlet opening, a second inlet opening, a stator feed circuit, a rotor feed circuit, and an intersection providing fluid communication between the stator feed circuit and the rotor feed circuit;
   wherein the coolant passages receive at least one coolant input through one or more of the first inlet opening and the second inlet opening to deliver coolant to the rotor through the rotor feed circuit and to the stator through the stator feed circuit;
   wherein the first inlet opening is in an axial first end of the casing; and
   wherein the rotor feed circuit includes an outer axial passage in the casing extending from the intersection to an end radial passage at a second axial end of the casing, the end radial passage extending to the rotor.

2. The electric machine of claim 1, further comprising an orifice in the coolant passages proximate the second inlet opening.

3. The electric machine of claim 2, wherein the orifice is removably mounted in the casing.

4. The electric machine of claim 2, wherein the orifice is formed integrally as a unitary part of the casing.

5. The electric machine of claim 1, wherein the rotor includes:
   a rotor shaft extending along and rotating about the drive axis, the rotor shaft having an axial coolant passage extending along the drive axis in fluid communication with the end radial passage of the rotor feed circuit;
   a rotor core coupled for co-rotation with the rotor shaft about the drive axis, the rotor core having one or more radial passages intersecting the axial coolant passage of the rotor shaft; and
   a plurality of permanent magnets carried by the rotor core and circumferentially spaced about the drive axis;
      wherein the rotor feed circuit of the casing routes the coolant from the end radial passage to the axial coolant passage of the rotor shaft which routes the coolant to the one or more radial passages of the rotor core which routes the coolant to the plurality of permanent magnets.

6. The electric machine of claim 1, further including a spray ring disposed about the drive axis within the casing at an axial end of the casing, the spray ring having coolant passages leading from one or more inlet openings to one or more spray outlets, the one or more inlet openings being in fluid communication with the stator feed circuit of the casing.

7. The electric machine of claim 6, wherein the spray ring is spaced from the stator by an axial gap extending along the drive axis; and
   wherein the spray ring sprays the coolant from the one or more spray outlets across the axial gap to the stator.

8. The electric machine of claim 7, further comprising an orifice disposed within the coolant passages and having a metering port that is sized to impart a spray velocity to the coolant sufficient for the coolant to span the axial gap and contact the stator.

9. The electric machine of claim 8, wherein the metering port of the orifice is sized so that the spray velocity is low enough to avoid vaporization of the coolant and deflection of the coolant off the stator.

10. The electric machine of claim 8, wherein the metering port of the orifice is sized so that the spray velocity is 3-9 m/s.

11. The electric machine of claim 8, wherein the stator includes:
   a plurality of annular ferromagnetic laminations secured together and aligned coaxially to form a lamination stack; and
   wire coils formed of conductive material and wrapped around at least a portion of the lamination stack, the wire coils having end turns extending axially beyond the lamination stack, the end turns spaced from the spray ring by the axial gap;
   wherein the spray ring sprays the coolant onto the end turns.

12. An electric machine, comprising:
   a drive assembly including a stator and a rotor rotatable about a drive axis relative to the stator; and
   a casing containing the drive assembly and having coolant passages, the coolant passages defining a first inlet opening, a second inlet opening, a stator feed circuit, a rotor feed circuit, and an intersection providing fluid communication between the stator feed circuit and the rotor feed circuit;

wherein the coolant passages receive at least one coolant input through one or more of the first inlet opening and the second inlet opening to deliver coolant to the rotor through the rotor feed circuit and to the stator through the stator feed circuit;

wherein the casing includes an annular body with an interior peripheral surface in contact with an outer periphery of the stator; and wherein the stator feed circuit defines one or more serpentine coolant passages that, at least in part, are recessed in the interior peripheral surface and in which the coolant is routed across the outer periphery of the stator.

13. An electric machine, comprising:

a drive assembly including a stator and a rotor rotatable about a drive axis relative to the stator; and a casing containing the drive assembly and having coolant passages, the coolant passages defining a first inlet opening, a second inlet opening, a stator feed circuit, a rotor feed circuit, and an intersection providing fluid communication between the stator feed circuit and the rotor feed circuit;

wherein the coolant passages receive at least one coolant input through one or more of the first inlet opening and the second inlet opening to deliver coolant to the rotor through the rotor feed circuit and to the stator through the stator feed circuit;

wherein the casing has a first axial end configured to mount a drive unit; and wherein the first inlet opening is an internal opening disposed in the first axial end of the casing and opens to an internal volume at the first axial end of the casing between the drive unit and casing.

14. The electric machine of claim 13, wherein the casing includes an annular body with an exterior periphery; and wherein the second inlet opening is an external opening through the exterior periphery of the annular body of the casing.

15. An electric machine, comprising:

a drive assembly including a stator and a rotor rotatable about a drive axis relative to the stator;

a casing containing the drive assembly and having coolant passages, the coolant passages defining a first inlet opening, a second inlet opening, a stator feed circuit, a rotor feed circuit, and an intersection providing fluid communication between the stator feed circuit and the rotor feed circuit; and an orifice disposed within the coolant passages and having a metering port configured to meter a flow of coolant to the stator feed circuit, wherein the coolant passages receive at least one coolant input through one or more of the first inlet opening and the second inlet opening to deliver coolant to the rotor through the rotor feed circuit and to the stator through the stator feed circuit;

wherein the casing has an annular body with an exterior periphery and a first axial end configured to mount a drive unit;

wherein the first inlet opening is an internal opening disposed in the first axial end of the casing and opens to an internal volume at the first axial end of the casing between the drive unit and casing; and wherein the second inlet opening is an external opening through the exterior periphery of the annular body of the casing.

16. The electric machine of claim 15, wherein the annular body of the casing has an interior peripheral surface in contact with an outer periphery of the stator; and wherein the stator feed circuit defines one or more serpentine coolant passages that, at least in part, are recessed in the interior peripheral surface and in which the coolant is routed across the outer periphery of the stator.

17. The electric machine of claim 15, wherein the rotor includes:

a rotor shaft extending along and rotating about the drive axis, the rotor shaft having an axial coolant passage extending along the drive axis in fluid communication with an end radial passage of the rotor feed circuit;

a rotor core coupled for co-rotation with the rotor shaft about the drive axis, the rotor core having one or more radial passages intersecting the axial coolant passage of the rotor shaft; and a plurality of permanent magnets carried by the rotor core and circumferentially spaced about the drive axis;

wherein the first inlet opening is in an axial first end of the casing and the rotor feed circuit includes an outer axial passage in the casing extending from the intersection to an end radial passage at a second axial end of the casing; and wherein the rotor feed circuit routes the coolant from the end radial passage to the axial coolant passage of the rotor shaft which routes the coolant to the one or more radial passages of the rotor core which routes the coolant to the plurality of permanent magnets.

18. The electric machine of claim 15, further including a spray ring disposed about the drive axis within the case at an axial end of the casing, the spray ring having coolant passages leading from one or more inlet openings to one or more spray outlets, the one or more inlet openings being in fluid communication with the stator feed circuit of the casing;

wherein the spray ring is spaced from the stator by an axial gap extending along the drive axis and the spray ring sprays the coolant from the one or more spray outlets across the axial gap to the stator; and wherein the metering port is sized to impart a spray velocity to the coolant sufficient for the coolant to span the axial gap and contact the stator while avoiding vaporization of the coolant and deflection of the coolant off the stator.

* * * * *

UNITED STATES PATENT AND TRADEMARK OFFICE
CERTIFICATE OF CORRECTION

PATENT NO. : 11,811,296 B2
APPLICATION NO. : 16/789070
DATED : November 7, 2023
INVENTOR(S) : Randall L. Long et al.

Page 1 of 1

It is certified that error appears in the above-identified patent and that said Letters Patent is hereby corrected as shown below:

On the Title Page

On Page 2, item [56], Line 1, delete "ip.com," and insert -- IP.com, --, therefor.

On Page 2, item [56], Line 5, delete "Deere & Company, pending utility U.S. Appl. No. 62/889,258, filed Aug. 20, 2019 which claims the benefit of U.S. Appl. No. 62/889,258, filed Aug. 20, 2019. (29 pages)." and insert -- Deere & Company, pending utility U.S. Appl. No. 16/570,416, filed September 13, 2019, which claims the benefit of provisional Appl. No. 62/889,258, filed Aug. 20, 2019. (29 pages) --, therefor.

On Page 2, item [56], Line 8, after "Pending" insert -- Provisional --.

On Page 2, item [56], Line 10, after "Pending" insert -- Provisional --.

Signed and Sealed this
Twenty-third Day of January, 2024

Katherine Kelly Vidal
*Director of the United States Patent and Trademark Office*